US009973962B2

(12) United States Patent
Beattie et al.

(10) Patent No.: US 9,973,962 B2
(45) Date of Patent: *May 15, 2018

(54) METHOD AND APPARATUS FOR DISTRIBUTING SERVICES AND DATA

(71) Applicant: AT&T Intellectual Property I, LP, Atlanta, GA (US)

(72) Inventors: James G. Beattie, Bergenfield, NJ (US); Veeramani Kandasamy, Annandale, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/339,416

(22) Filed: Oct. 31, 2016

(65) Prior Publication Data
US 2017/0048743 A1     Feb. 16, 2017

Related U.S. Application Data

(63) Continuation of application No. 14/621,449, filed on Feb. 13, 2015, now Pat. No. 9,516,463, which is a
(Continued)

(51) Int. Cl.
*H04W 4/02*         (2018.01)
*H04W 28/02*        (2009.01)
(Continued)

(52) U.S. Cl.
CPC ....... *H04W 28/0226* (2013.01); *H04L 67/104* (2013.01); *H04L 67/18* (2013.01);
(Continued)

(58) Field of Classification Search
CPC .. G06Q 20/3224; G06Q 20/28; H04B 5/0031; H04L 67/104; G06F 3/167;
(Continued)

(56) References Cited

U.S. PATENT DOCUMENTS 6,970,966 B2    11/2005    Gemelli et al.
7,149,541 B2    12/2006    Rautila
(Continued)

FOREIGN PATENT DOCUMENTS

AU    2011223996 B2    5/2012
EP       1831792 A2    9/2007
(Continued)

OTHER PUBLICATIONS

Eisl, Jochen et al., "Traffic management building blocks in next generation mobile telecommunication systems", Celtic Telecommunication Solutions, Mevico, pp. 1-54, 2011.
(Continued)

*Primary Examiner* — Phuoc H Doan
(74) *Attorney, Agent, or Firm* — Guntin & Gust, PLC; Joseph Hrutka

(57) ABSTRACT

Aspects of the subject disclosure may include, for example, determining a need to provide a service to a first communication device of a plurality of communication devices, detecting a movement of a second communication device of the plurality of communication devices in a direction that will place the second communication device in a communication range of the first communication device, and transmitting a message to the second communication device to provide the service to the first communication device when the second communication device comes into the communication range of the first communication device. Other embodiments are disclosed.

20 Claims, 7 Drawing Sheets

Related U.S. Application Data continuation of application No. 14/058,767, filed on Oct. 21, 2013, now Pat. No. 9,008,696.

(51) Int. Cl.
*H04L 29/08* (2006.01)
*H04W 76/02* (2009.01)

(52) U.S. Cl.
CPC ............. *H04W 4/02* (2013.01); *H04W 4/023* (2013.01); *H04W 4/026* (2013.01); *H04W 4/028* (2013.01); *H04W 28/0231* (2013.01); *H04W 76/023* (2013.01)

(58) Field of Classification Search
CPC ....... G06F 17/241; G06F 21/10; G08G 1/166; H04M 3/541; H04W 4/22
USPC ............ 455/411, 456.3, 414.1, 456.1, 552.1; 340/572.1; 380/258; 370/329
See application file for complete search history.

(56) References Cited

U.S. PATENT DOCUMENTS

| | | |
|---|---|---|
| 7,203,490 B2 | 4/2007 | Karabinis et al. |
| 7,212,811 B2 | 5/2007 | Dowling et al. |
| 7,299,050 B2 | 11/2007 | Delaney et al. |
| 7,814,483 B2 | 10/2010 | Li |
| 7,991,397 B2 | 8/2011 | Willey et al. |
| 8,175,603 B1 | 5/2012 | Hoole |
| 8,423,656 B2 | 4/2013 | Lowry et al. |
| 8,489,095 B2 | 7/2013 | Oh et al. |
| 8,498,281 B2 | 7/2013 | Maki |
| 8,644,511 B2 | 2/2014 | Chen |
| 2007/0198674 A1 | 8/2007 | Li et al. |
| 2008/0247400 A1 | 10/2008 | Schoettle |
| 2009/0005003 A1 | 1/2009 | Hartwell |
| 2009/0131017 A1 | 5/2009 | Osborn |
| 2010/0306339 A1 | 12/2010 | Ling et al. |
| 2011/0102459 A1 | 5/2011 | Hall |
| 2011/0154135 A1 | 6/2011 | Tyhurst et al. |
| 2012/0003965 A1* | 1/2012 | Eisinger .................. G06F 21/10 455/414.1 |
| 2012/0083256 A1 | 4/2012 | Sperling et al. |
| 2012/0231777 A1 | 9/2012 | Lewis et al. |
| 2013/0337771 A1* | 12/2013 | Klein ...................... H04W 4/22 455/411 |
| 2015/0092676 A1 | 4/2015 | Periyalwar et al. |

FOREIGN PATENT DOCUMENTS

| | | |
|---|---|---|
| EP | 2530959 A1 | 12/2012 |
| EP | 1526457 B1 | 3/2013 |
| WO | WO2010090459 A2 | 8/2010 |
| WO | WO2001076154 A2 | 10/2011 |

OTHER PUBLICATIONS

Nossenson, Ronit, "Base Station Application Optimizer." Data Communication Networking (DCNET), Proceedings of the 2010 International Conference on. IEEE, 2010.

* cited by examiner

300

METHOD AND APPARATUS FOR DISTRIBUTING SERVICES AND DATA

CROSS-REFERENCE TO RELATED APPLICATION(S)

This application is a continuation of U.S. patent application Ser. No. 14/621,449 filed Feb. 13, 2015 (now U.S. Patent Pub No. 2015/0163628), which is a continuation of U.S. patent application Ser. No. 14/058,767 filed Oct. 21, 2013 (now U.S. Pat. No. 9,008,696). All sections of the aforementioned applications are incorporated herein by reference in their entirety.

FIELD OF THE DISCLOSURE

The subject disclosure relates to a method and apparatus for distributing services and data.

BACKGROUND

In wireless, and sometimes wired communication systems, a need can arise to distribute in real-time, near real-time or in deferred time, media content or other services to devices. The network bandwidth required to distribute streaming media content, device software or data updates can be distributed in traditional unicast and emerging multicast broadcast modes, but even then there are devices that are either served with less desirable link signal qualities or which are offline when an update is made available.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for delegating services to devices to offload network resources. Other embodiments are included in the subject disclosure.

One embodiment of the subject disclosure includes a system having a memory to store executable instructions, and a processor. Responsive to executing the instructions, the processor performs operations including receiving location information from a plurality of communication devices, determining trajectories of the plurality of communication devices from the location information, determining a need to distribute first content to a first communication device of the plurality of communication devices, detecting a trajectory of a second communication device of the plurality of communication devices that will be in a peer-to-peer communication range of the first communication device at an expected time, and transmitting the first content to the second communication device for distribution to the first communication device when the second communication device comes into the peer-to-peer communication range of the first communication device.

One embodiment of the subject disclosure includes a method for receiving, a system comprising a processor, location information from a plurality of communication devices, determining, by the system, a collective trajectory of the plurality of communication devices from the location information, determining, by the system, a need to provide a service to a first communication device of the plurality of communication devices, detecting, by the system, a trajectory of a second communication device of the plurality of communication devices that places the second communication device in a communication range of the first communication device at an expected time, and transmitting, by the system, a message to the second communication device to provide the service to the first communication device when the second communication device comes into the communication range of the first communication device.

One embodiment of the subject disclosure includes a machine-readable storage medium, including executable instructions, which when executed by a processor cause the processor to perform operations including determining a need to provide a service to a first communication device of a plurality of communication devices, detecting a movement of a second communication device of the plurality of communication devices in a direction that will place the second communication device in a communication range of the first communication device, and transmitting a message to the second communication device to provide the service to the first communication device when the second communication device comes into the communication range of the first communication device.

Figure 1:
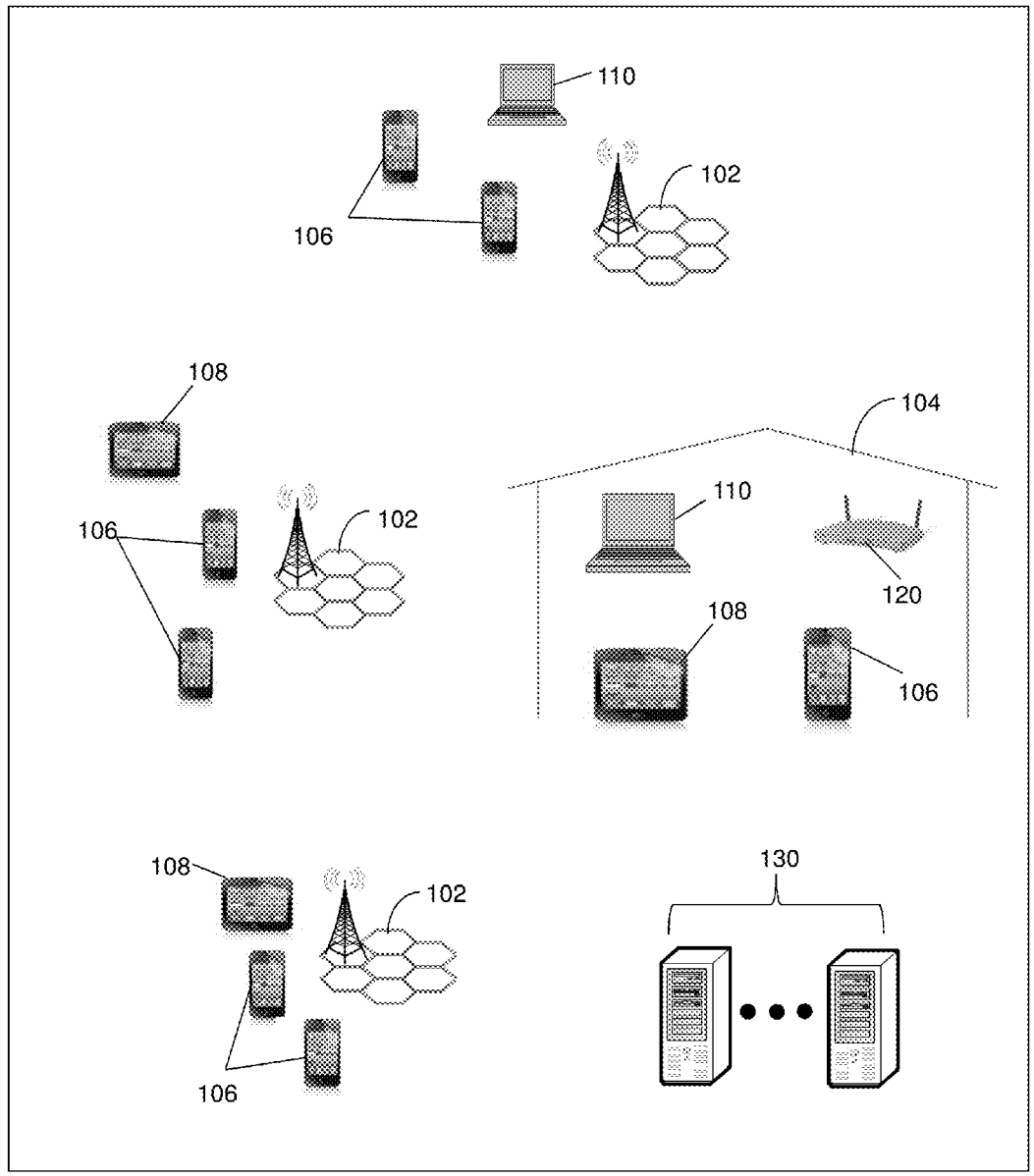
FIG. 1 depicts an illustrative embodiment of a communication system.

FIG. 1 depicts an illustrative embodiment of a communication system 100. The communication system 100 can comprise mobile devices such as smartphones 106, tablets 108, and computers 110. Devices 106-110 can establish communication sessions by way of wireless base stations 102 scattered in multiple geographic regions. Communication sessions can include device to network to device communications for supporting voice and data communications using 2G, 3G, 4G, or 5G technology as the case may be. Alternatively, devices 106-110 can engage in voice and data communications by way of short range base stations or routers 120 such as WiFi routers which may be located in facilities 104 such as retail businesses (such as coffee shops, fast food restaurants, etc.), business enterprises, residences, and so on.

Figure 2:
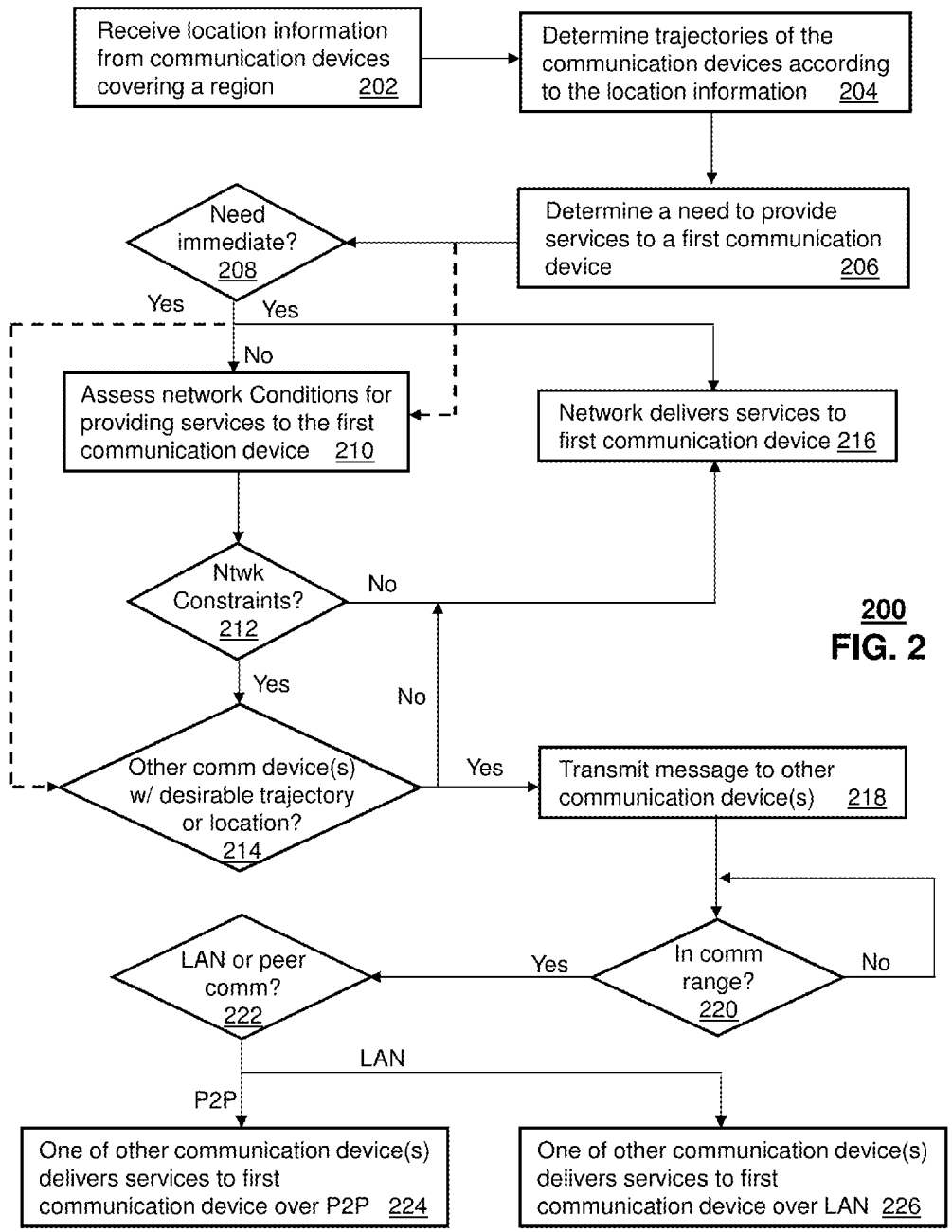
FIG. 2 depicts an illustrative embodiment of a method used in portions of the system described in FIG. 1.

FIG. 2 depicts an illustrative embodiment of a method 200 that can be used in portions of the system 100 described in FIG. 1 to improve network resource utilization. Method 200 can begin with step 202 where a server or a group of servers 130 such as shown in FIG. 1 collect location information from communication devices (such as communication devices 106-110 shown in FIG. 1) over one or more geographic regions (townships, cities, metropolitan areas, etc.). The servers 130 can be communicatively coupled to the communication devices via the base stations 102, routers 120, or other network elements that can be used to wireless or by wireline access the communication devices from remote locations. Additionally, the servers 130 can be co-located or placed in disparate locations, each server managing communication devices in different locations. For illustration purposes only, the subject disclosure will herein refer to servers 130. However, it should be understood that less than all the servers 130 (e.g., a single server) may employ the embodiments of method 200 of FIG. 2 as described below.

Referring back to step 202, the location information can include geographic coordinates such as global positioning system (GPS) coordinates provided by the communications device from GPS receivers embedded therein, or by way of service provider network infrastructure (e.g., triangulation), regardless of GPS capabilities of the communications device(s). The servers 130 can collect this information periodically so as to determine from changes in the location information trajectories of the communications devices in step 204. Trajectories can represent movement information such as average speed of travel as well as direction of travel. The orientation of the devices such as compass orientation can also be collected to validate and/or predict trajectories of the communication devices in FIG. 1.

At step 206, the servers 130 can determine a need to provide services to a particular one or more of the communication devices of FIG. 1. For illustration purposes only, only one device will be addressed at step 206 referred to herein as a first communication device. The service can be media content (such as a streaming video), data content (such as provisioning information, a file, etc.), software content (such as delivery of a software update), or communication services such as providing voice or internet communication services, and so on. Services in the present context can mean delivery of data of any kind or communication services of any kind. The servers 130 can determine the need for services at step 206 by way of a request initiated by the first communication device autonomously or responsive to user input. Alternatively, or in combination, the servers 130 can determine the need for services at step 206 by monitoring resources of the first communication device, usage behavior of a user of the first communication device, or other suitable detection techniques.

At step 208, the servers 130 can determine if the need is immediate or can be deferred. An immediate need may be a situation in which the user of the first communication device may be requesting communication services, and would not be willing to wait. A deferred need can represent a request for content initiated by the user which can be delivered at a later time (e.g., movie for viewing at 8 pm, while the user request is initiated at 6 pm), a software update that the servers 130 determine is needed to solve vulnerability issues with the communication device but which is otherwise not considered urgent by the servers 130, and so on.

In one embodiment, if the need at step 208 is considered immediate, the server 130 can proceed to step 216 and instruct a network node (e.g., a base station), which is communicatively coupled to the first communication device at the time the need is detected, to provide services (such as data distribution and/or communication services) to the first communication device. In another embodiment, the servers 130 can determine from the trajectories of the communication devices calculated at step 204 whether there is a second communication device at a location or trajectory that places the second communication device in a communication range of the first communication device at a desirable time to provide the services identified in step 206. If there are no devices that can provide such services in an adequate time, the servers 130 can proceed to step 216 and deliver services via a network node communicatively coupled to the first communication device as previously described.

If, however, there is a second communication device that can deliver the needed services to the first communication in an adequate time, the servers 130 can proceed to step 218 and transmit a message to the second communication device to prepare the second communication device for delivery of the needed services. The message can represent data to be distributed to the first device (e.g., video stream, software update, files, provisioning information, etc). The message can instead or in combination represent instructions to provide the first communication device data and/or voice communication services once the second communication device is in a communication range of the first communication device at step 220.

The second communication device can detect it is in a communication range of the first communication device based on additional information provided by the servers 130 at step 218 such as, for example, receiving from the servers 130 an identification of the network node which the first communication device is communicatively coupled to and a communication identifier (e.g., phone number, IP address, URI, or other suitable identifier) of the first communication device for initiating communications. Alternatively, the second communication device can receive from the servers 130 a location coordinate of the first communication device, which the second communication device can use to determine when it is in close proximity to the first communication device to perform a peer-to-peer session.

For example, when the second communication device detects the network node communicatively coupled to the first communication device (or that the second communication device is near the location coordinate of the first communication device) the second communication device can determine at step 222 whether to engage in peer-to-peer communications or utilize a local area network (LAN) such as a WiFi router 120 as shown in FIG. 1 if one is available. If the first and second communication devices are not close enough to engage in peer-to-peer communications, then the second communication device can attempt communications over a WiFi LAN. If a LAN is not available, the second communication device can continue to monitor when the second communication device is near enough to the location coordinate of the first communication device to attempt a peer-to-peer session. If both LAN and peer-to-peer communications are available, the second communication device can test communications on each and assess the best delivery method based on communication metrics such as bit error rate, latency, jitter, RF noise, signal to noise ratio, or other common communication parameters. Once communications are established, the second communication device can proceed to step 224 to deliver services over a peer-to-peer session, or step 226 to deliver services over a LAN session, whichever is decided as most appropriate in step 222.

As noted earlier, the services can represent delivery of any form of data services, any form of messaging services, any form of communication services or both. Data can represent, for example, media content, provisioning information, file transfers, software updates or otherwise. Messaging services can represent, for example, SMS, MMS, instant messaging, email, etc. Communication services can represent data and/or voice communication services. Steps 208 and 214-226 present a proactive approach to alleviate traffic congestion, which can increase the bandwidth availability of network nodes such as base stations 102. In one embodiment, steps 208 and 214-226 can be performed without monitoring network conditions of network nodes.

Alternatively, network conditions of network nodes can be monitored prior to deciding to use a courier device for providing services to the first communication device. Referring back to step 208, the transition from step 208 to step 210 can represent an embodiment where the servers 130 can be configured to perform a network assessment at step 210 when the need to provide services is determined at step 208 not to be immediate. In one embodiment, network conditions can be assessed according to communication efficiency, bandwidth usage, and traffic congestion, among other factors. Service providers can configure the servers 130 to compare factors such as these to corresponding thresholds for detecting undesirable network conditions. For example, the servers 130 can measure the traffic level experienced by a network node which is communicatively coupled to the first communication device and compare such a measure to a threshold.

Traffic levels can be measured, for example, as a weighted sum of a number of active voice calls in session, a number of active data sessions, bandwidth utilization, packet losses, and so on. If the measured traffic level exceeds the threshold established by the service provider, the servers 130 can determine at step 212 that relieving congestion at the network node would be desirable, and thereby transition to step 214 and combinations of subsequent steps 218-226 as previously described to determine if an alternate courier (e.g., a second communication device) is available to provide services to the first communication device.

Alternatively, or in combination, the servers 130 can be configured to determine at step 210 a measure of communication efficiency at the network node and compare this measure to a threshold. If communication efficiency at the network node falls below a threshold established by the service provider, the servers 130 can be configured to transition to step 214 and combinations of subsequent steps 218-226 to determine if an alternate courier (e.g., a second communication device) is available to provide services to the first communication device. Communication efficiency can be measured by statistical models that assess, for example, management of resources and bandwidth at the network node.

In yet another embodiment, the servers 130 can be configured to transition from step 206 to step 210 thereby bypassing step 208. In this embodiment, the servers 130 can be configured to always assess network conditions at step 210 independent of whether or not the need for services detected step 216 is immediate. When network conditions are undesirable to provide services by way of the network node at step 216, the servers 130 may proceed to step 214 and combinations of subsequent steps 218-226 to locate alternate couriers as previously described.

Figure 3:
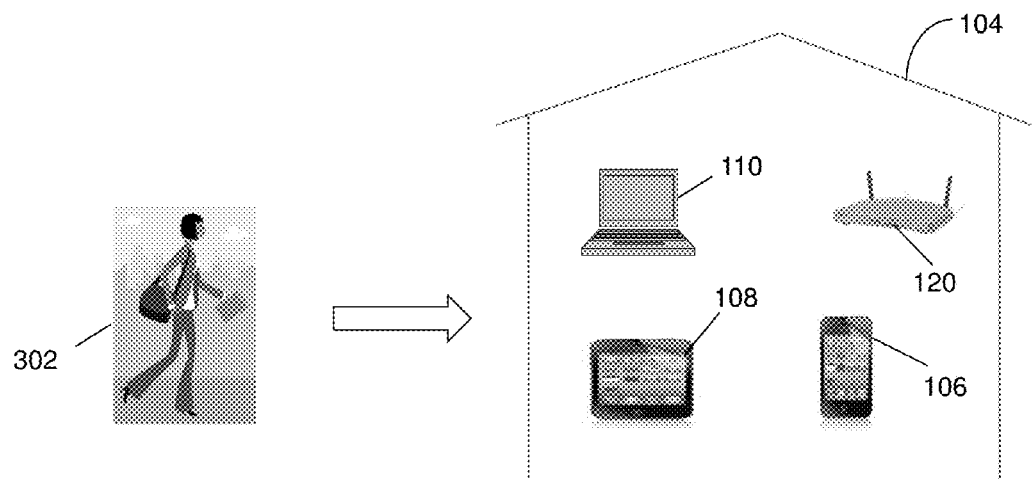
FIG. 3 depicts an illustrative embodiment of mobile device users in transit that can serve as couriers of deferred services.
Figure 3:
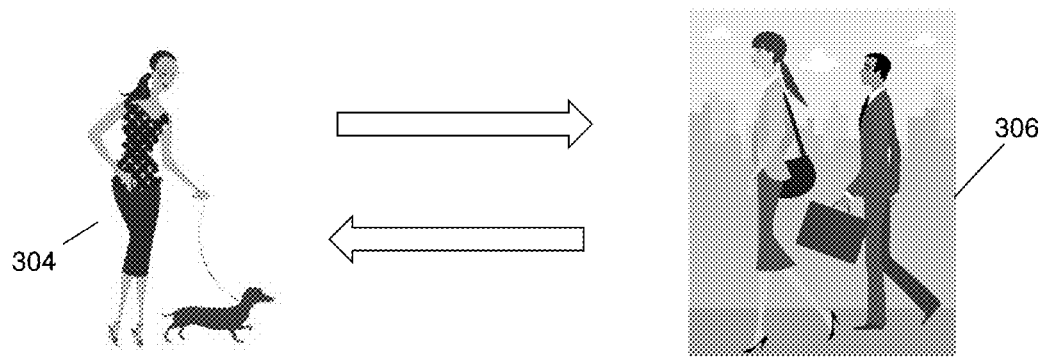

FIG. 3 depicts illustrations of how the trajectory of communication devices carried by multiple users 302-306 can monitored and used to determine if a particular communication device can serve as a courier that provides services to another device.

For example, suppose the communication device carried by user 302 appears to have a trajectory towards building 104, which may be an office building or retail store. From a prior history of travel of user 302, which can be monitored from a collection of GPS information provided by the user's communication device, the servers 130 can determine a probable outcome of whether user 302 will be entering building 104. If the probability is high (e.g., user has a habit of entering building 104, which is known for providing coffee beverages, between 1-1:15 pm each day), the servers 130 may choose to target the user's communication device as a courier for services to be provided to one of the devices (106-110) in building 104 shown in FIG. 3. Since building 104 supports a LAN via router 120, the targeted courier device of user 302 may choose to establish communications via the LAN unless it assesses that the quality of communications would improve in a peer-to-peer session.

Similarly, the servers 130 can assess the likelihood that users 304 and 306 will cross paths. This determination can also be determined by prior history of travel by the users 304 and 306, or proximity in distance between the users and/or a determination that the users are walking on a sidewalk and would unlikely walk on the adjacent street. Since in this instance LAN services are not available, communications would be based on a peer-to-peer session between a select one of the communication devices acting as a courier device for another communication device. Also, since in this use case, the users 304 and 306 would be crossing paths, the servers 130 would have to limit services for specific tasks that can be accomplished quickly such as providing provisioning information to a target communication device, or providing small portions of data to the target communication device. In this use case, content of a significant size can be delivered to a target device by apportioning the content in parts.

For instance, suppose the communication device of user 304 requires a large software update. The servers 130 can choose to provide a portion of the update to one of the communication devices of users 306, which is delivered in a peer-to-peer session. Other devices of users at a downstream location that merges with the trajectory of user 304 can provide with other sub-portions of the software update. Suppose further that the servers 130 run out of courier devices to deliver sub-portions of the software update, but that 80% of the software update has been delivered by the couriers thus far. In this instance, the servers 130 can direct a network node (e.g., base station 102) communicatively coupled to the communication device of user 304 to deliver the remaining 20%. In this scenario although delivery was not fully accomplished by courier devices, the reduction in use of network nodes provides for less traffic and higher bandwidth availability, which in turn can serve to accommodate more subscribers on a communication network and defer the need for additional network upgrades which can be costly to service providers.

It is further noted that services as described above may be pre-paid or post-paid services, while the service experience may be over wired or wireless devices with or without motion or movement sensing method described herein.

Figure 4:
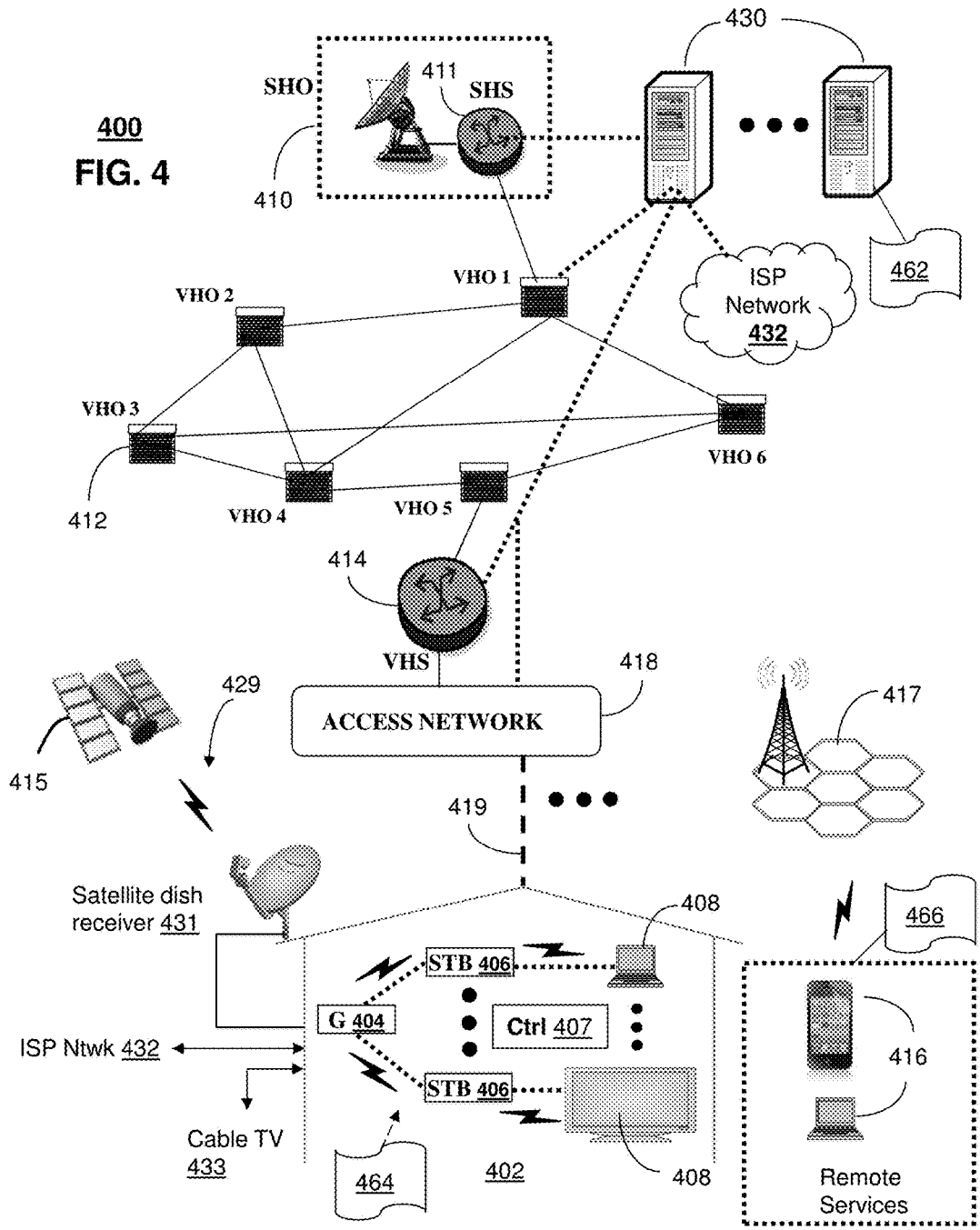
FIGS. 4-5 depict illustrative embodiments of communication systems that provide services according to the embodiments of the method of FIG. 2.

FIG. 4 depicts an illustrative embodiment of a first communication system 400 for delivering media content. The communication system 400 can represent an Internet Protocol Television (IPTV) media system. Communication system 400 can be overlaid or operably coupled with the communication system 100 of FIG. 1 as another representative embodiment of communication system 400. Additionally, communication system 400 can be configured to perform the service delivery techniques described by method 200 of FIG. 2.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as servers 430. The servers 430 can use computing and communication technology to perform function 462, which can include among other things, the techniques described by method 200 of FIG. 2. The media processors 406 and wireless communication devices 416 can be provisioned with software functions 464 and 466, respectively, to utilize the services of servers 430 and thereby perform in whole or in part the techniques described in method 200 of FIG. 2.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
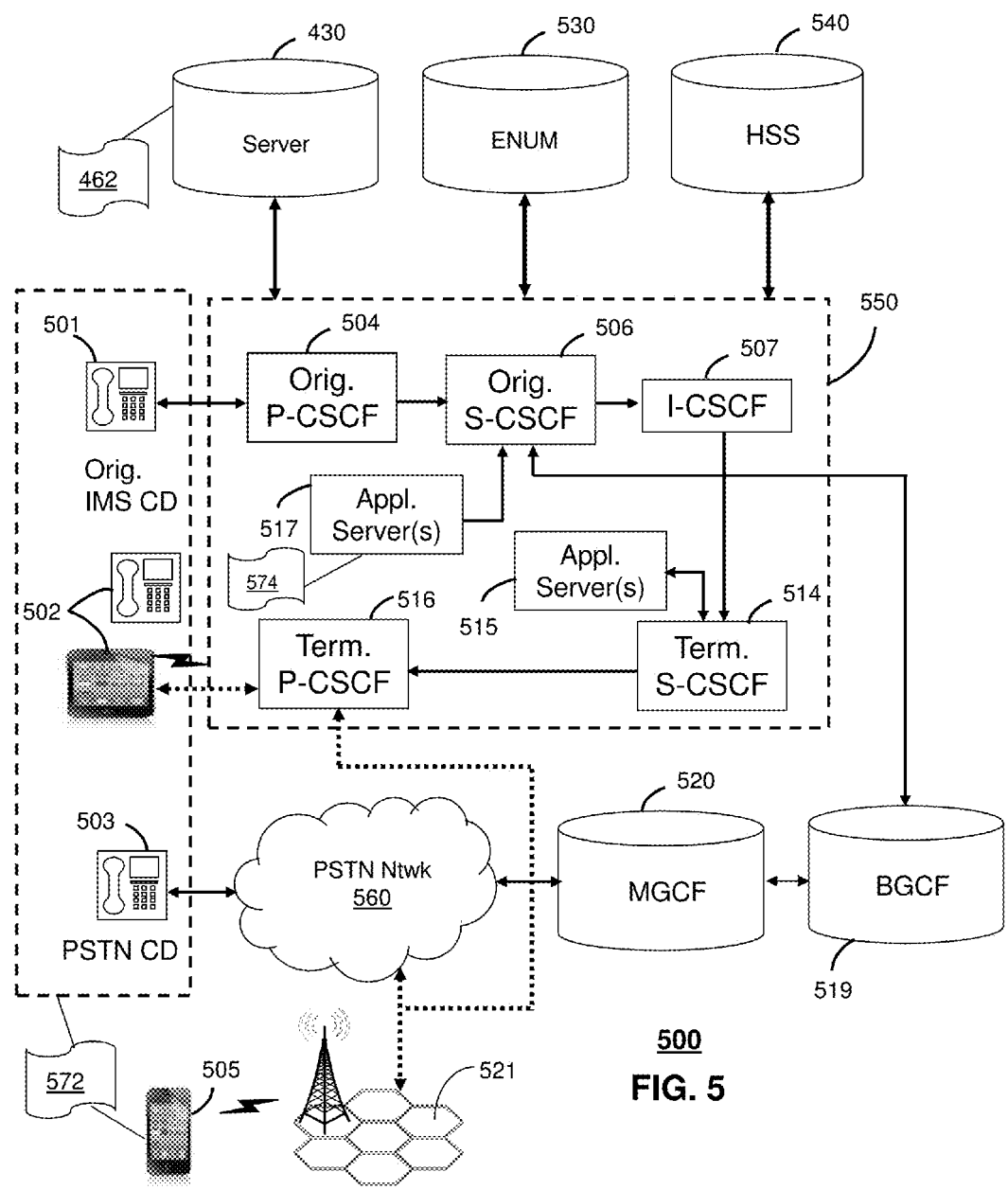

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with communication system 100 and communication system 400 as another representative embodiment of communication system 400. Additionally, communication system 500 can be configured to perform the service delivery techniques described by method 200 of FIG. 2.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The servers 430 of FIG. 4 can be operably coupled to the second communication system 500 for purposes similar to those described above. Servers 430 can perform function 462 and thereby provide services to the CDs 501, 502, 503 and 505 of FIG. 5 as described by method 200 of FIG. 2. CDs 501, 502, 503 and 505 can be adapted with software to perform function 572 to utilize the services of the servers 430 as described by method 200 of FIG. 2. Servers 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
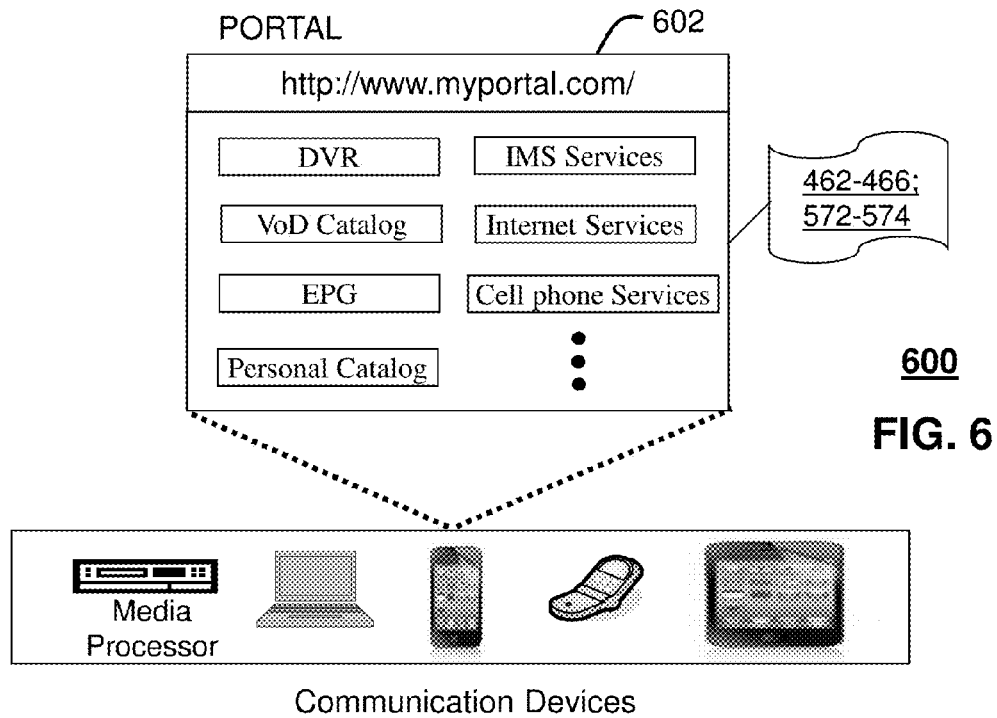
FIG. 6 depicts an illustrative embodiment of a web portal for provisioning devices of the embodiments depicted in FIGS. 1 and 3-5.

FIG. 6 depicts an illustrative embodiment of a web portal 602 which can be hosted by server applications operating from the computing devices 430 of the communication system 100 illustrated in FIG. 1. Communication system 600 can be overlaid or operably coupled with communication system 100, communication 400, and/or communication system 500 as another representative embodiment of communication system 100, communication 400, and/or communication system 500. Web portal 602 can be configured to support the services of method 200 of FIG. 2 and enable users to provision their communication devices to take advantage of these services, or to opt-out of the services if desired. The web portal 602 can also be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-464, and 572-574 to adapt these applications as may be desired by subscribers and/or service providers of communication systems 100 and 400-500.

Figure 7:
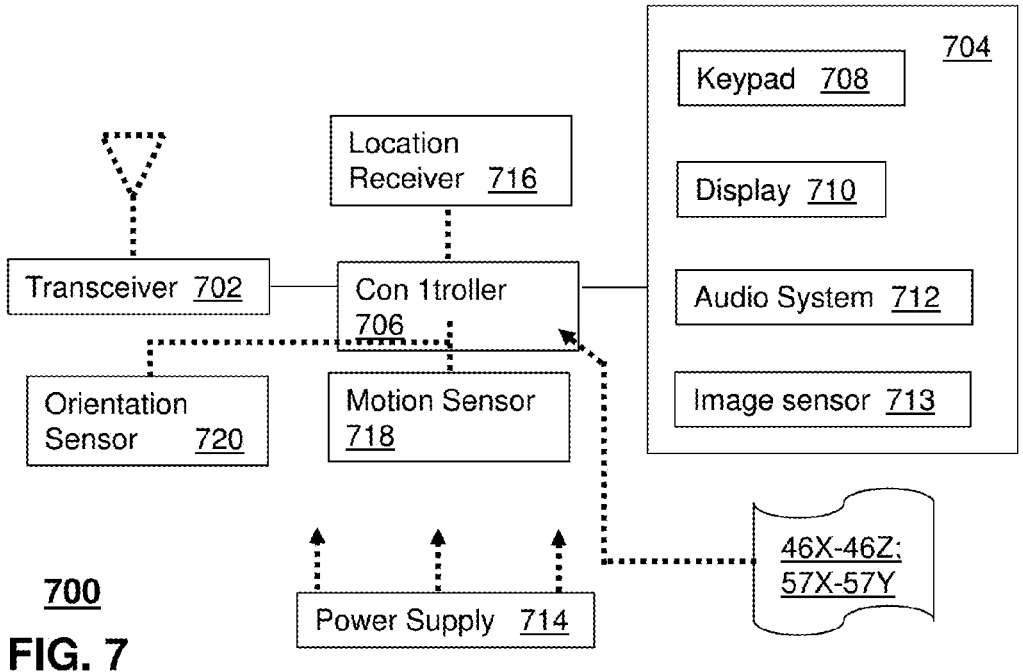
FIG. 7 depicts an illustrative embodiment of a communication device that be a representative embodiment of the devices of FIGS. 1 and 3-5.

FIG. 7 depicts an illustrative embodiment of a communication device 700. Communication device 700 can serve in whole or in part as an illustrative embodiment of the devices depicted in FIG. 1 and FIGS. 4-5. Additionally, communication device 700 can be configured to perform in whole or in part the service delivery techniques described by method 200 of FIG. 2.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the devices of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in communication systems 100, 400-500 of FIGS. 1 and 4-5.

The communication device 700 shown in FIG. 7 or portions thereof can serve as a representation of one or more of the devices of communication system 100, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the servers 130 can transmit a message to the first communication device that is to receive the services identified at step 206 of FIG. 3. The message can include a communication identifier of the second communication and an expected time of arrival. The first communication device can monitor when the second communication device is in its communication range and initiate communications with the second communication device using the communication identifier of the second communication device rather than wait for the second communication device to initiate communications.

Method 200 can also be adapted so that the servers 130 can instruct more than one courier device to deliver services to the first communication device, thereby increasing the probability of delivery of such services. Once the first communication device receives the needed services from one of the courier devices, it can inform other couriers that there's no longer a need to deliver services.

Additionally, method 200 can be adapted for broadcasting delivery of services. For example, a single courier device can broadcast (multicast) a software update to multiple devices at the same time for more efficient delivery of software updates when in a communication range of these devices. The courier device can also provide data services to multiple devices as a hotspot access point.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
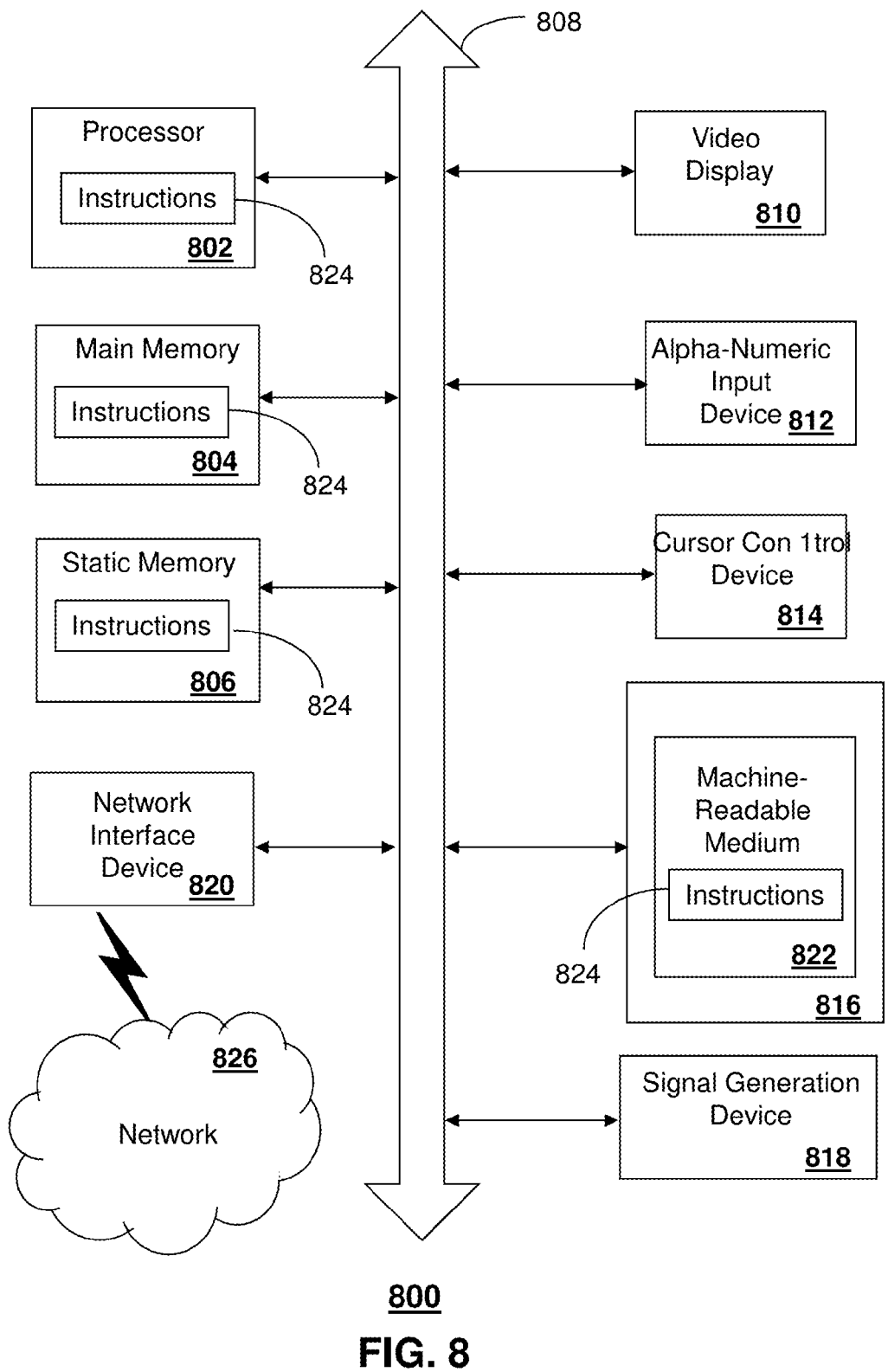
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the servers 130 and 430, the communication devices illustrated in FIGS. 1, 4-6, and other devices from these illustrations. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a processing system including a processor; and
a memory that stores executable instructions that, when executed by the processing system, facilitate performance of operations, comprising:
receiving information from a first communication device and a second communication device, wherein the information includes location information for the first and second communication devices;
comparing a location of the first communication device with a location of the second communication device to predict whether the first communication device and the second communication device will be in a peer-to-peer communication range of each other based on a trajectory of the second communications device; and
transmitting content to the second communication device for distribution to the first communication device responsive to the second communication device coming into the peer-to-peer communication range of the first communication device.

2. The system of claim 1, wherein the transmitting the content to the second communication device is responsive to determining that a traffic level of a network node communicatively coupled to the first communication device exceeds a threshold.

3. The system of claim 1, wherein the first communication device autonomously sends a request to communicate with the second communication device.

4. The system of claim 1, wherein the transmitting the content to the second communication device is responsive to determining that a communication efficiency of a network node communicatively coupled to the first communication device is below a threshold.

5. The system of claim 1, wherein the information further includes a communication identifier.

6. The system of claim 1, wherein the processor comprises a plurality of processors operating in a distributed processing environment.

7. The system of claim 1, wherein the comparing comprises determining a time of arrival based on the location information for the first and second communication devices and the trajectory of the second communications device to predict whether the first communication device and the second communication device will be in the peer-to-peer communication range of each other.

8. The system of claim 1, wherein the transmitting is performed responsive to receiving a request receive content from the first communication device.

9. The system of claim 1, wherein the trajectory of the second communication device is based on location information received from the second communication device.

10. The system of claim 9, wherein the trajectory of the second communication device is based on triangulation information provided by infrastructure communicatively coupled to the second communication device.

11. The system of claim 1, wherein the trajectory of the second communication device is based on location data comprising geographic data and orientation data.

12. The system of claim 11, wherein the geographic data is supplied by a coordinate sensor of the second communication device, and wherein the orientation data is supplied by an orientation sensor of the second communication device.

13. A method, comprising:
receiving, by a processing system comprising a processor, a request to provide a service to a first communication device;
comparing, by the processing system, a first location of the first communication device, a trajectory of a second communication device, and a second location of the second communication device to predict if the first communication device will be within a communication range of the second communication device; and
directing, by the processing system, the second communication device to provide the service to the first communication device when the second communication device comes into the communication range of the first communication device, wherein transmission of data between the second communication device and the first communication device occurs when the second communication device comes into peer-to-peer communication range of the first communication device.

14. The method of claim 13, wherein the processor comprises a plurality of processors operating in a distributed processing environment.

15. The method of claim 13, wherein the service comprises one of voice communication services, data communication services, or both.

16. The method of claim 13, wherein the trajectory of the second communication device is based on triangulation information provided by infrastructure communicatively coupled to the second communication device, and wherein the service comprises delivery of media content.

17. The method of claim 13, wherein the second communication device initiates a local area network to deliver the service to the second communication device.

18. A non-transitory, machine-readable storage medium, comprising executable instructions that, when executed by a processing system including a processor, facilitate performance of operations, comprising:
predicting, by a first communication device, that a second communication device will be in a communication range of the first communication device based on first location information of the first communication device and second location information of the second communication device and based on a determining of a second trajectory of the second communication device compared to the second location information;
initiating, by the first communication device, a communication session with the second communication device when the second communication device is in the communication range of the first communication device; and
providing, by the first communication device, a service to the second communication device during the communication session.

19. The non-transitory, machine-readable storage medium of claim 18, wherein the predicting further comprises determining a first trajectory of the first communication device based on the first location information.

20. The non-transitory, machine-readable storage medium of claim 19, wherein the first trajectory is compared to the second trajectory to determine an expected time of arrival for the first communication device to be within the communication range of the second communication device.

* * * * *